United States Patent
Vitins et al.

(10) Patent No.: US 6,551,746 B1
(45) Date of Patent: Apr. 22, 2003

(54) RECHARGEABLE ELECTROCHEMICAL CELL OF LITHIUM ION OR LITHIUM ALLOY-TYPE POSSESSING METAL OXIDE MODIFIED CATHODE STRUCTURE WITH HIGH FIRST CHARGE CAPACITY

(75) Inventors: Girts Vitins, Riga (LV); Keld West, Hellerup (DK); Rene Koksbang, Odense S (DK)

(73) Assignee: Danionics A/S, Odense S (DK)

( * ) Notice: Subject to any disclaimer, the term of this patent is extended or adjusted under 35 U.S.C. 154(b) by 0 days.

(21) Appl. No.: 09/673,157

(22) PCT Filed: Apr. 7, 1999

(86) PCT No.: PCT/EP99/02377

§ 371 (c)(1),
(2), (4) Date: Dec. 8, 2000

(87) PCT Pub. No.: WO99/53556

PCT Pub. Date: Oct. 21, 1999

(30) Foreign Application Priority Data

Apr. 9, 1998 (GB) ............................................. 9807774

(51) Int. Cl.[7] ................................................. H01M 4/58
(52) U.S. Cl. ................................ 429/231.1; 429/218.1; 429/221; 429/224; 429/231.8
(58) Field of Search ............................ 429/218.1, 221, 429/224, 231.1, 231.8

(56) References Cited

U.S. PATENT DOCUMENTS

| 3,970,473 A | 7/1976 | Roth et al. ................. 136/83 R |
| 4,302,518 A | 11/1981 | Goodenough et al. ...... 429/104 |
| 4,507,371 A | 3/1985 | Thackeray et al. .......... 429/191 |
| 4,668,595 A | 5/1987 | Yoshino et al. ............. 429/194 |

(List continued on next page.)

FOREIGN PATENT DOCUMENTS

| JP | 08007883 | 1/1996 |
| WO | 97/01191 | 1/1997 |
| WO | 97/24773 | 7/1997 |
| WO | 97/48140 | 12/1997 |

OTHER PUBLICATIONS

Shirane et al., "Structure and physical properties of lithium iron oxide, LiFeO2, synthesized by ionic exchange reaction," Solid State Ionics 79 (1995) 227–233.*

Kanoh et al., J. Electrochem. Soc. 140, 3162–3166 (1993).

*Primary Examiner*—Carol Chaney
*Assistant Examiner*—Dah-Wei D. Yuan

(57) ABSTRACT

The invention relates to a rechargeable electrochemical cell comprising a negative electrode, an electrolyte and a positive electrode, characterized in that the positive electrode structure thereof comprises (a) one or more materials selected from the group consisting of $LiMn_2O_4$, $LiCoO_2$, $LiNiO_2$, $LiNi_xCo_{1-x}O_2$ where $0<x<1$, preferably $LiMn_2O_4$ and (b) one or more materials selected from the group consisting of orthorhombic $LiMnO_2$, monoclinic $LiMnO_2$ (m-$LiMnO_2$), hexagonal $LiFeO_2$ (h-$LiFeO_2$), $\alpha$-$NaMnO_2$, $\beta$-$NaMnO_2$, $\alpha$-$NaFeO_2$, and lithium/sodium compounds of the formula $Li_xNa_yM(II)O_{1+1/2(x+y)}$, where $x\geq 0$, $y\geq 0$ and $x+y\leq 2$, and where M(II) is a transition metal in oxidation state +2, selected from the group consisting of Mn, Co, Ni and Fe, preferably $Li_xNa_yMn(II)O_{1+1/2(x+y)}$, where $x\geq 0$, $y\geq 0$ and $x+y\leq 2$, more preferably $LiNa_{0.6}MnO_{1.8}$, the material(s) of group (a) being present in the electrode structure in an amount corresponding to 20–98% by weight of the complete electrode structure, and the material(s) of group (b) being present in the electrode structure in an amount corresponding to 1–79% by weight of the complete electrode stucture.

17 Claims, 8 Drawing Sheets

Li / M-LiMnO2

U.S. PATENT DOCUMENTS

| | | | |
|---|---|---|---|
| 5,240,794 A | 8/1993 | Thackeray et al. | 429/234 |
| 5,266,299 A | 11/1993 | Tarascon | 423/599 |
| 5,316,875 A | 5/1994 | Murai et al. | 429/194 |
| 5,352,548 A | 10/1994 | Fujimoto et al. | 429/197 |
| 5,358,805 A | 10/1994 | Fujimoto et al. | 429/218 |
| 5,370,710 A | 12/1994 | Nagaura et al. | 29/623.1 |
| 5,429,890 A | 7/1995 | Pynenburg et al. | 429/192 |
| 5,478,672 A | 12/1995 | Mitate | 429/194 |
| 5,506,078 A | 4/1996 | Davidson et al. | 429/224 |
| 5,531,920 A | 7/1996 | Mao et al. | 252/182.1 |
| 5,558,961 A | 9/1996 | Doeff et al. | 429/224 |
| 5,561,006 A | 10/1996 | Lecerf et al. | 429/218 |
| 5,561,007 A | 10/1996 | Saidi | 429/224 |
| 5,783,333 A * | 7/1998 | Mayer | 423/332 |
| 5,789,110 A * | 8/1998 | Saidi et al. | 429/218.1 |
| 6,007,947 A * | 12/1999 | Mayer | 429/223 |

* cited by examiner

RECHARGEABLE ELECTROCHEMICAL CELL OF LITHIUM ION OR LITHIUM ALLOY-TYPE POSSESSING METAL OXIDE MODIFIED CATHODE STRUCTURE WITH HIGH FIRST CHARGE CAPACITY

FIELD OF THE INVENTION

This invention relates to rechargeable electrochemical cells of the lithium-ion or lithium-alloy type.

BACKGROUND OF THE INVENTION

The use of non-aqueous electrolytes has allowed the development of high voltage lithium-based electrochemical cells for energy storage. Such cells are further characterised in that their electrodes may be intercalation compounds. The positive electrode structures may be based on transition metal oxides operating at a potential close to 4V vs. Li/Li$^+$. Negative electrode structures of carbons and graphites may be applied, which reversibly intercalate lithium at a potential close to the potential of metallic lithium. Such cells are referred to as lithium-ion cells, as the active lithium is always in its ionic form. Alternatively, alloy negative electrode structures like Li—Al and Li—Sn may be used. Such cells will be referred to as lithium-alloy cells. All of the above configurations provide voltages close to 4V.

For the cells referred to above one of the limiting factors for their energy density has been a low initial capacity retention. Upon operation, a capacity loss during initial charging of the cells is observed, as is a fading capacity upon extended cycling or storage, which in combination define the initial capacity retention.

The capacity reduction phenomena are ascribed to the instability of the electrolyte towards the electrodes. Instability towards the negative electrode leads to gassing and formation of a passivating film, whereas instability against the positive electrode leads to corrosion of the electrode structure. Both phenomena involve electrolyte decomposition and result in loss of active lithium and a fading capacity of the cell.

In lithium-ion cells, the losses from the anode reactions dominate the losses at the cathode. The magnitude of the losses merely depends on the type of carbon(s)/graphite(s), the electrolyte and their combination. Using carbon-based anodes, active lithium corresponding to 30–50% of the amount of active lithium in the cell may be lost during the first charge-discharge cycles of the cell, i.e. during the initial charging and the young life of the cell. The use of graphites permits somewhat lower losses in the range 5–30%, however, with poorer long term capacity retention.

In the lithium-ion cell active lithium is provided solely via the cathode. Although prelithiation of carbon/graphite anode structures has been investigated, traditionally lithium-free carbon/graphite structures are applied. Compared to cells based on pure metallic lithium, the loss of active material is rather detrimental. Whereas metallic lithium can be added at 3,800 mAh/g, the specific capacities of the cathode materials are significantly lower.

Currently, LiMn$_2$O$_4$ is one of the active cathode materials used in lithium-ion cells. The active lithium capacity thereof depends to some extent on the preparation method, but is generally of the order of 122 mAh/g.

Therefore, simply providing additional LiMn$_2$O$_4$ to compensate for any loss of active material is somewhat inefficient and may reduce the lithium-ion cell capacity and energy density significantly.

Losses occur in the lithium-alloys cells, too. In the alloy cells with which the present invention is concerned, the lithium alloys are formed in-situ, as this obviates the need for the difficult handling of low potential lithium compounds, e.g. under inert conditions. In such cells active lithium is provided solely via the cathode.

In one type of alloy cell the base material is provided as an oxide. In the case of tin, the reaction scheme is:

$$4\,Li+SnO_2 \rightarrow 2Li_2O+Sn$$

$$4.4\,Li+Sn \rightarrow Li_{4.4}Sn$$

This scheme clearly shows the irreversible loss of lithium in terms of lithium oxide, in this case being in the range of 48% of the total amount of active lithium.

In another type of lithium-alloy cell lithium is simply alloyed into the base metal, such as aluminium or silicon, which is applied directly in the cell. In the case of aluminium, the reaction scheme is:

$$xLi+Al \rightarrow Li_xAl$$

In such case a loss is observed as the diffusion of lithium in the α-phase of the lithium-aluminium alloy is so slow that lithium therefrom is practically not released during discharge of the cell. Further, the above instability phenomena still exist and cause additional loss of active lithium.

Therefore, there is a need for an efficient concept for providing additional active lithium to compensate for capacity losses in lithium ion cells as well as in lithium-alloy cells. Such active lithium is provided entirely via the cathode.

A number of patents describes approaches to compensate for the loss of active lithium:

U.S. Pat. Nos. 5,429,890 and 5,561,007, both to Valence Technology, suggest the use of LiMO$_2$ additives ('890: M=Ni,Co and mixtures thereof, '007: Li$_y$-α-MnO$_2$) to a LiMn$_2$O$_4$ based cathode. As the additives mainly display rechargeable capacity, these patents are merely aiming at closing the voltage gap between the 3 V and the 4 V plateaus of the Li/LiMn$_2$O$_4$ system.

U.S. Pat. No. 5,370,710 to Sony describes a different approach to alleviating the capacity loss, in particular doping of a LiMn$_2$O$_4$ cathode material with an additional amount of lithium to obtain a compound Li$_{1+x}$Mn$_2$O$_4$ compound either by chemical or electrochemical means. A specific chemical doping method is described in U.S. Pat. No. 5,266,299 to Bell Communication Research, which involves doping of LiMn$_2$O$_4$ or λ-MnO$_2$ with LiI.

U.S. Pat. Nos. 4,507,371 and 5,240,794, both to Technology Finance Cooperation, describe lithium manganese oxides with excess lithium compared to LiMn$_2$O$_4$. '371 describes cathode structures of Li$_{1+x}$Mn$_2$O$_4$, x>0, whereas '794 describes a range of compositions within the compositional area defined by the corner compositions Li$_{14}$Mn$_5$O$_{12}$, Li$_2$Mn$_3$O$_4$, LiMn$_3$O$_4$ and Li$_4$Mn$_5$O$_{12}$, including Li$_{1+x}$Mn$_2$O$_4$ where x≧0.25.

Although a number of approaches exists for the introduction of additional active lithium into rechargeable lithium cells, there is still a need for additives to cathodes of such cells, which provide high capacity, safe and simple processing and which are low cost compounds.

A number of patents describe the use of alkali metal transition metal oxide cathode materials.

U.S. Pat. No. 3,970,473 to General Electric Company discloses a solid state electrochemical cell, the cathode comprising a non-stoichiometric lithium compound of the composition Li$_x$Mn$_y$O$_z$, 0<x<1 and 0<y≦3 and z has a value to obtain electrical neutrality. Although such compositions include LiMnO$_2$ structures, the patents does not suggest the use of such compounds as an additive to LiMn$_2$O$_4$-cathode structures.

U.S. Pat. No. 4,302,518 by Goodenough and Mizuchima describes an A$_x$M$_y$O$_2$ structure (A: Li, Na, K, M: transitions metal, x<1, y≈1) having the layers of α-NaCrO$_2$, which is monoclinic. The patent, however, does not disclose on the use of such compounds as an additive to LiMn$_2$O$_4$-cathode structures.

U.S. Pat. No. 4,668,595 to Asahi describes a secondary battery with a negative electrode of a carbonaceous material and a positive electrode of layered composite oxide of the formula A$_x$M$_y$N$_z$O$_2$, where A is an alkali metal, M is a transition metal, N is selected from the group of Al, In, and Sn, and $0.05 \leq x \leq 1.10$, $0.85 \leq y \leq 1.00$ and $0.001 \leq z \leq 0.10$, respectively. The patent, however, does not suggest composite cathode structures.

U.S. Pat. No. 5,316,875 to Matsushita discloses a process for the lithiation of LiMn$_2$O$_4$, LiMnO$_2$, LiCoO$_2$, LiNiO$_2$ LiFeO$_2$ or γ-V$_2$O$_5$ by exposure to butyllithium, phenyl-lithium or naphtyllithium. The patent, however, does not suggest use of the cathode active materials as additives to LiMn$_2$O$_4$-cathode structures.

U.S. Pat. No. 5,352,548 to Sanyo describes the use of cathode materials selected from V$_2$O$_5$, TiS$_2$, MoS$_2$, LiCoO$_2$, LiMnO$_2$, LiNiO$_2$, LiCrO$_2$, LiMn$_2$O$_4$ and LiFeO$_2$ in a secondary cell with a vinylene carbonate containing electrolyte. The patent does not describe the use of these cathode materials in composite cathode structures.

U.S. Pat. No. 5,358,805 also to Sanyo describes the use of the materials FeS$_2$, MoS$_2$, TiS$_2$, LiNiO$_2$, LiMn$_2$O$_3$, LiFeO$_2$, LiCoO$_2$ and MnO$_2$ as cathode in a secondary battery with a BC$_3$N-anode. The concept of composite cathodes is not described in this patent.

U.S. Pat. No. 5,478,672 to Sharp describes a secondary cell based on a lithium manganese oxide cathode, which is characterised by having an X-ray diffraction pattern (CuK-α) which shows at least three peaks in the ranges 15.2–15.6°, 18.6–18.8° and 24.5–25.1°, the lithium manganese oxide typically having a chemical composition Li$_x$MnO$_y$, 0.8<x<1.2 and 1.9<y<2.2. Although the X-ray diffraction patterns of the above lithium manganese oxide and of the lithium manganese oxide used according to the present invention have at least one common peak, the patent does not describe the use of such compounds in a combined cathode application with LiMn$_2$O$_4$.

U.S. Pat. No. 5,506,078 to National Research Council of Canada describes a method of forming a spinel-related λ-Li$_{2-x}$Mn$_2$O$_4$ by electrochemical deintercalation of lithium from an orthorhombic LiMnO$_2$ of space group Pmnm and unit cell a=4.572 Å, b=5.757 Å and c=2.805 Å. Although the unit cell dimensions of the patent is in fair accordance with those of the orthorhombic LiMnO$_2$ used according to the present invention, the patent does not disclose composite cathodes of LiMnO$_2$ and LiMn$_2$O$_4$.

U.S. Pat. No. 5,531,920 to Motorola describes a method for the synthesis of AMO$_2$ compounds, A being selected from the group of Li, Na, K and their combinations and M being selected from the group of Ti, V, Mn, Cr, Fe, Ni, Co and their combinations. The patent discloses a method in which M(OH)$_2$ is reacted with oxidizing compounds selected from the group of Li$_2$O$_2$, LiNO$_3$, LiClO$_4$, Na$_2$O, K$_2$O$_2$ and their combinations. The patent, however, does not disclose the use of such compounds as an additive to LiMn$_2$O$_4$-cathode structures.

U.S. Pat. No. 5,558,961 to The Regents of the University of California, describes an orthorhombic alkali metal manganese oxide secondary cell based on a cathode active material M$_x$Z$_y$Mn$_{1-y}$O$_2$, where M is an alkali metal, Z is a metal capable of substituting for manganese such as iron, cobalt or titanium, $0.2 \leq x \leq 0.75$, and $0 \leq y \leq 0.6$, which is initially formed as Na$_{0.44}$Z$_y$Mn$_{1-y}$O$_2$. Although the patent discloses orthorhombic LiMnO$_2$ and its use in electrochemal cells, it does not describe the use of such material as an additive to LiMn$_2$O$_4$-cathode structures. The patent further describes cathodes of lithiated orthorhombic sodium manganese oxide, however, the manganese of the lithium/sodium manganese oxide compounds is in an oxidation state in the range +3 to +4, i.e. higher than the oxidation state of +2 used according to the present invention. Further, the patent does not give any teaching on the use of such material as an additive to LiMn$_2$O$_4$-cathode structures.

U.S. Pat. No. 5,561,006 to SAFT describes a rechargeable cell with a cathode including at least one orthorhombic substance which is a yellow-green single phase oxide of lithium and manganese with lattice parameters a=0.459±0.004 nm, b=0.577±0.004 nm and c=0.281±0.003 nm and a molar ratio of Li and Mn in the range 0.85–1.10. Although the lattice parameters of the black orthorhombic LiMnO$_2$ used according to the present invention are within the range given by SAFT, the patent does not describe the use of the yellow-green oxide as an additive to LiMn$_2$O$_4$-cathode structures.

DETAILED DESCRIPTION OF THE INVENTION

The present invention provides rechargeable lithium cells wherein the extra cathode material needed to alleviate the consequences of the capacity loss referred to above is one or more components which have higher specific capacities than that of the rechargeable cathode material.

The substituted capacity may be non-rechargeable, since there is no absolute need according to the invention, for the extra cathode material to contribute to the rechargeable capacity of the cathode. The invention is therefore aiming at lithium-ion cells and lithium-alloy cells, which comprise additives, which are able to deliver a substantially higher capacity in the first charge than the rechargeable cathode material itself, but which do not necessarily contribute to the rechargeable capacity upon further cycling of the electrochemical cell. On the other hand, the extra cathode material may contribute to the rechargeable capacity of the cathode and any such additional rechargeable capacity may be beneficial for the performance of the cell.

More specifically the present invention provides electrochemical cells of the lithium-ion and lithium-alloy type, which as additive to their cathode structures comprise one or more compounds selected from a series of alkali metal transition metal oxides which have high first charge capacities.

The present invention provides a rechargeable electrochemical cell comprising a negative electrode, an electrolyte and a positive electrode, characterised in that the positive electrode structure thereof comprises (a) one or more materials selected from the group consisting of LiMn$_2$O$_4$, LiCoO$_2$, LiNiO$_2$, LiNi$_x$Co$_{1-x}$O$_2$ where 0<x<1, preferably LiMn$_2$O$_4$ and (b) one or more materials selected from the group consisting of orthorhombic LiMnO$_2$, monoclinic LiMnO$_2$ (m-LiMnO$_2$), hexagonal LiFeO$_2$ (h-LiFeO$_2$), α-NaMnO$_2$, β-NaMnO$_2$, α-NaFeO$_2$, and lithium/sodium compounds of the formula Li$_x$Na$_y$M$_y$(II)O$_{1+1/2(x+y)}$, where $x \geq 0$, $y \geq 0$ and $x+y \leq 2$, and where M(II) is a transition metal in oxidation state +2, selected from the group of consisting of Mn, Co, Ni and Fe, preferably $Li_xNa_yMn(II)O_{1+1/2(x+y)}$, where $x \geq 0$, $y \geq o$ and $x+y \leq 2$, more preferably $LiNa_{0.6}MnO_{1.8}$, the material(s) of group (a) being present in the electrode structure in an amount corresponding to 20–98% by weight of the complete electrode structure, and the material(s) of group (b) being present in the electrode structure in an amount corresponding to 1–79% by weight of complete electrode structure, with the proviso that in the case of the material(s) of group (b) including any of $\alpha$-$NaMnO_2$, $\beta$-$NaMnO_2$, $\alpha$-$NaFeO_2$ and $Li_xNa_yM(II)O_{1+1/2(x+y)}$, the amount of active sodium originally present in the positive electrode should be lower than the amount of lithium originally present in the electrolyte phase, and with the further proviso, that any material of group (b) in the positive electrode structure should display a higher first charge specific capacity than any material of group (a) in the positive electrode structure.

According to the present invention, an electrochemical cell is provided, containing a cathode structure comprising $LiMn_2O_4$ and a material selected from a series of alkali metal transition metal oxides, a non-aqueous electrolyte comprising one or more lithium salts and an anode which comprises an electrochemically active carbon structure selected from the group of graphite, coke and carbon blacks or an alloy based on a metal, in particular aluminium and silicon, or based on a metal oxide, in particular tin oxides.

The alkali metal transition metal oxides used according to the present invention are orthorhombic $LiMnO_2$ (o-$LiMnO_2$), monoclinic $LiMnO_2$ (m-$LiMnO_2$), hexagonal $LiFeO_2$ (h-$LiFeO_2$), $\alpha$-$NaMnO_2$, $\beta$-$NaMnO_2$, $\alpha$-$NaFeO_2$ and mixed lithium/sodium compounds of the formula $Li_xNa_yM(II)O_{1+1/2(x+y)}$, where $x \geq 0$, $y \geq 0$ and $x+y \leq 2$, and where M(II) is a transition metal in its oxidation state +2, selected from the group of Mn, Co, Ni and Fe.

Although other transition metal oxides exist, the above compounds are characterised by having high first charge capacities in practical electrochemical cells, i.e. their practical capacities are close to their theoretical capacities. Further, the extraction of lithium proceeds without deterioration of the rechargeable compounds of the cathode, which are stable against the delithiated additive.

In a preferred embodiment of the invention the additive cathode material is monoclinic $LiMnO_2$.

In another preferred embodiment of the invention the additive cathode material is orthorhombic $LiMnO_2$. Such orthorhombic $LiMnO_2$ may be characterised by one or more of the following features:

(1) peaks of full width at half maximum of less than 0.2° at 2θ-values of 25.0°, 39.4° and 45.2° upon XRD analysis using CuKα;

(2) having been prepared at a temperature higher than 600° C. (High Temperature-o-$LiMnO_2$, HT-o-$LiMnO_2$); and (3) having a mean particle size in the range 20–40μ. Alternatively, such orthorhombic $LiMnO_2$ may be characterised by one or more of the following features:

(4) peaks of full width at half maximum of at least 0.25° at 2θ-values of 25.0°, 39.4° and 45.2° upon XRD analysis using CuKα;

(5) having been prepared at a temperature no higher than 600° C. (Low Temperature-o-$LiMnO_2$, LT-o-$LiMnO_2$); and (6) having a mean particle size in the range 5–15μ.

In another preferred embodiment of the invention the additive cathode material is monoclinic $\alpha$-$NaFeO_2$.

In another preferred embodiment of the invention the additive cathode material is selected from the group consisting of lithium/sodium compounds of the formula $Li_xNa_yM(II)O_{1+1/2(x+y)}$, where $x \geq 0$, $y \geq 0$ and $x+y \leq 2$, and where M(II) is a transition metal in oxidation state +2, selected from the group consisting of Mn, Co, Ni and Fe, preferably lithium/sodium compounds of the formula $Li_xNa_yMn(II)O_{1+1/2(x+y)}$, where $x \geq 0$, $y \geq 0$ and $x+y \leq 2$, more preferably $LiNa_{0.6}MnO_{1.8}$.

According to the invention, the lithium containing additives compensate directly for the loss of active lithium in the cell. Surprisingly, other alkali metal compounds, and in particular those sodium compounds used according to the present invention, may provide compensation as well.

In the case of sodium, however, it is additionally required that the amount of sodium in the cathode can be accomodated by the electrolyte. During the first charge of the battery, little or no intercalation of sodium into the anode structure will take place, and during the first discharge of the battery, little or no reintercalation of sodium into the cathode structure should be anticipated. Consequently there should be little or no sodium species in any of the electrodes, so that all or almost all of the sodium should be accomodated in the electrolyte phase. Even in this state, the lithium ion conductivity in the electrolyte phase should be sufficient to allow proper cell operation. Therefore, the original amount of lithium in the electrolyte should be higher than the original amount of sodium in the cathode. In this case the sodium salt of the electrolyte is acting entirely as supporting electrolyte, not taking part in any of the electrode reactions.

The findings of the group of Kanoh (J. Electrochem. Soc. 140 (1993) 3162–66) confirm this observation. This group evaluated the selectivity of $LiMn_2O_4$ and $\lambda$-$MnO_2$ for $Li^+$ over $Na^+$ and $K^+$. They concluded that especially the lithium-free structure $\lambda$-$MnO_2$ showed high selectivity for $Li^+$, i.e. that in the presence of $Li^+$, no intercalation of $Na^+$ or $K^+$ will take place.

In a preferred embodiment of the invention the negative electrode consists of a coke or a carbon black. In such an electrochemical cell the cathode composition comprises rechargeable material and additive in amounts corresponding to 20–98% and 1–79% by weight of the complete electrode structure, respectively, preferably 50–98% and 1–49% by weight of the complete electrode structure, respectively, more preferably 60–94% and 5–39% by weight of the complete electrode structure, respectively, even more preferably 60–80% and 10–30% by weight of the complete electrode structure, respectively, with the proviso that in the case of the group of additives including any of $\alpha$-$NaMnO_2$. $\beta$-$NaMnO_2$, $\alpha$-$NaFeO_2$ and $Li_xNa_yM(II)O_{1+1/2(x+y)}$, where $x \geq 0$, $y \geq 0$ and $x+y \leq 2$, and where M(II) is a transition metal in oxidation state +2, selected from the group of Mn, Co, Ni and Fe, the amount of active sodium originally present in the positive electrode should be lower than the amount of lithium originally present in the electrolyte phase.

In another preferred embodiment of the invention the negative electrode consists of a graphite. In such an electrochemical cell the cathode composition comprises rechargeable material and additive in amounts corresponding to 20–98% and 1–79% by weight of the complete electrode structure, respectively, preferably 50–98% and 1–49% by weight of the complete electrode structure, respectively, more preferably 80–98% and 1–19% by weight of the complete electrode structure, respectively, even more preferably 80–89% and 1–10% by weight of the complete electrode structure, respectively, with the proviso that in the case of the group of additives including any of $\alpha$-$NaMnO_2$, β-NaMnO$_2$, α-NaFeO$_2$ and Li$_x$Na$_y$M(II)O$_{1+1/2(x+y)}$, where x≧0, y≧0 and x+y≦2, and where M(II) is a transition metal in oxidation state +2, selected from the group of Mn, Co, Ni and Fe, the amount of active sodium originally present in the positive electrode should be lower than the amount of lithium originally present in the electrolyte phase.

In a preferred embodiment of the invention the electrolyte of the electrochemical cell comprises one or more non-aqueous solvents selected from the group of ethylene carbonate (EC), propylene carbonate (PC), dimethyl carbonate (DMC), diethyl carbonate (DEC), γ-valerolactone, γ-butyrolactone and one or more salts selected from the group of LiCF$_3$So$_3$, LiAsF$_6$, LiBF$_4$, LiPF$_6$ and LiClO$_4$.

In an alternative embodiment of the invention the rechargeable material is selected from the group of LiCoO$_2$, LiNiO$_2$, LiNi$_x$Co$_{1-x}$O$_2$ where 0<x<1. These materials have capacities in the range 140–160 mAh/g.

In the following tables and examples LiNa$_{0.6}$MnO$_{1.8}$ is used as a representative of the group of lithium/sodium compounds of the formula Li$_x$Na$_y$M(II)O$_{1+1/2(x+y)}$, where x≧0, y≧0 and x+y≦2, and where M(II) is a transition metal in oxidation state +2, selected from the group of Mn, Co, Ni and Fe. The use of LiNa$_{0.6}$MnO$_{1.8}$ as a representative should not be considered as any limitation of the scope of the invention.

Table I below summarises the theoretical and actually measured initial capacities of the additives of the present invention. The specific capacities (mAh/g) are measured in half cells with lithium metal negative electrodes at low rate (C/50). They are determined from the amount of charge passed across the cells in the first charge half cycle and the mass of the active material in the cathodes. The initial capacities are obtained upon first charge to 4.3V, 4.5V and 4.7V vs. Li/Li$^+$, respectively.

TABLE I

Specific first charge capacities (mAh/g) of oxide cathode additive materials

| Oxide Additive | First Charge Capacity (mAh/g) | | | |
|---|---|---|---|---|
| | Theoretical | Actual | | |
| | | 4.3 v | 4.5 v | 4.7 v |
| HT-o-LiMnO$_2$ | 286 | 155 | 186 | 248 |
| LT-o-LiMnO$_2$ | 286 | 220 | 264 | — |
| m-LiMnO$_2$ | 286 | 230 | 243 | 260 |
| h-LiFeO$_2$ | 283 | 17 | 40 | 164 |
| α-NaMnO$_2$ | 244 | 112 | 141 | — |
| β-NaMnO$_2$ | 244 | 149 | 171 | — |
| α-NaFeO$_2$ | 242 | 12 | 120 | 219 |
| LiNa$_{0.6}$MnO$_{1.8}$ | 411 | 293 | 308 | 339 |

As can be seen from Table I, the first charge capacities of the cathode additives used according to the present invention are significantly higher than the capacity of LiMn$_2$O$_4$.

According to the invention, the first charge capacities of any of the cathode additives should be higher than the first charge capacities (equal to the rechargeable capacities) of any of the rechargeable cathode materials, with which the additives are used in composite cathodes.

Table II below summarises actually measured rechargeable (reversible) capacities of the additives used according to the present invention. The specific capacities (mAh/g) are measured in half cells with lithium metal negative electrodes at low rate (C/50). They are determined from the amount of charge passed across the cells in the first discharge half cycle and the mass of the active material in the cathodes. The reversible capacities were measured upon cycling in the potential range 3.5–4.3 V vs. Li/Li$^+$.

TABLE II

Specific reversible capacities (mAh/g) of oxide cathode additive materials.

| Oxide Additive | Reversible Capacity (mAh/g) |
|---|---|
| HT-o-LiMnO$_2$ | 42 |
| LT-o-LiMnO$_2$ | 58 |
| m-LiMnO$_2$ | 72 |
| h-LiFeO$_2$ | 7 |
| α-NaMnO$_2$ | 10 |
| β-NaMnO$_2$ | 12 |
| α-NaFeO$_2$ | 2 |
| LiNa$_{0.6}$MnO$_{1.8}$ | 13 |

As can be seen from Table II, the cathode additives of the present invention display small but significant rechargeable capacities.

Table III below summarises the initial (first charge) capacities of composite cathode structures comprising mixtures corresponding to 1:1 combinations (by charge) of the indicated cathode additive and LiMn$_2$O$_4$.

The 1:1 combination by charge used in table III and below in table IV and examples 13–16 illustrate the preferred cathode composition in the case of approximately 50% irreversible loss at the anode. In such a case the reversible and irreversible capacities of the cathode would match the reversible capacity and irreversible loss at the anode. The use of the 1:1 by charge combination should not be considered as any limitation of the scope of the invention.

The capacities were measured in half cells with lithium metal negative electrodes at low rate (C/50). They are determined from the amount of charge passed across the cells in the first half cycle and the total amount of oxide in the cathodes structures, i.e. they are specific initial capacities (mAh/g) for the 1:1 by charge composite of additive and LiMn$_2$O$_4$. The initial capacities are obtained upon first charge to 4.5V and 4.7V (vs. Li/Li$^+$), respectively.

TABLE III

Specific first charge capacities (mAh/g) of mixed oxide cathode structures.

| Cathode composition | First Charge Capacity (mAh/g) | |
|---|---|---|
| | 4.5 V | 4.7 V |
| m-LiMnO$_2$ + LiMn$_2$O$_4$ | 155 | 161 |
| α-NaFeO$_2$ + LiMn$_2$O$_4$ | 146 | 155 |

As can be seen from Table III, the first charge capacities of the composite cathode structures of additives of the present invention and LiMn$_2$O$_4$ are significantly higher than the capacity of pure LiMn$_2$O$_4$.

Table IV below summarises actually measured rechargeable (reversible) capacities of composite cathode structures comprising mixtures corresponding to 1:1 combinations (by charge) of the indicated cathode additive and LiMn$_2$O$_4$. The specific capacities (mAh/g) are measured in half cells with lithium metal negative electrodes at low rate (C/50). They are determined from the amount of charge passed across the cells in the first discharge half cycle and the mass of the active material in the cathodes, i.e. they are specific reversible capacities (mAh/g) for the 1:1 by charge composite of additive and LiMn$_2$O$_4$. The reversible capacities were measured upon cycling in the potential range 3.5–4.3 V (vs. Li/Li$^+$).

TABLE IV

Specific reversible capacities (mAh/g) of mixed oxide cathode structures.

| Oxide Composition | (w %) | Reversible specific Capacity (mAh/g) Composite | Weighted sum of individual components |
|---|---|---|---|
| m-LiMnO$_2$ + LiMn$_2$O$_4$ | 31.9:68.1 | 97 | 106 |
| α-NaFeO$_2$ + LiMn$_2$O$_4$ | 35.8:64.2 | 85 | 79 |

As can be seen from Table IV, the reversible capacities of the composite cathode structures are in accordance with the sum of reversible capacities of the individual components, weighted by their relative abondance.

EXAMPLE 1

Figure 1:
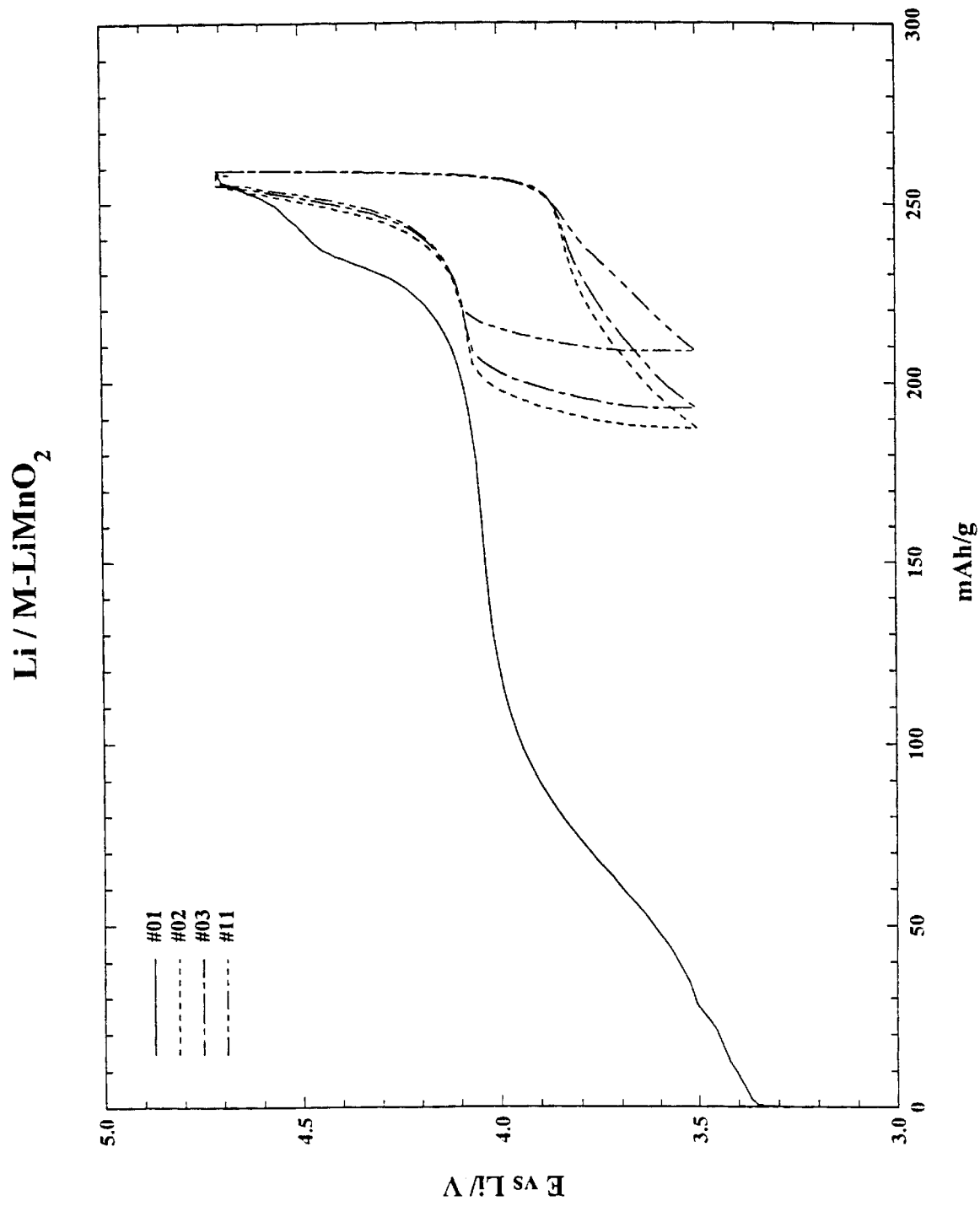
FIG. 1 shows the voltage-capacity relationship for a Li/m-LiMnO$_2$ couple during first charge and subsequent discharge-charge cycling.

α-NaMnO$_2$ was prepared from equimolar (Na/Mn=1) amounts of Na$_2$CO$_3$ and Mn$_2$O$_3$, which were intimately ground and placed in a Ni crucible. The mixture was heated twice to 720° C. in air for 20 h and then quenched to room temperature. Between these two firings the powder was reground in a mortar. The final powder was yellowish brown, and powder XRD showed the correct phase of α-NaMnO$_2$. Indexing of the XRD pattern showed monoclinic lattice parameters. A chemical analysis showed that the stoichiometry was approximately Na/Mn=1 giving a theoretical capacity of 244 mAh/g.

EXAMPLE 2

Monoclinic LiMnO$_2$ (m-LiMnO$_2$) was obtained by ion exchange from α-NaMnO2 (from example 1) as follows: 8 g (0.0728 mole) of α-NaMnO$_2$ were stirred in 150 ml solution of n-hexanol and 50 g LiBr (0.575 mole, 7.9 times excess of Li). The mixture was refluxed for 10 h followed by vacuum filtration and washing with 100 ml ethanol. Finally, the powder was washed in methanol and dried at 150° C. under vacuum. The powder XRD of the brown powder confirmed that the correct phase with less than 5% impurities was obtained. The pattern has been indexed with a monoclinic unit cell (a=5.437(3), b=2.809(3), c=5.393(3) Å). The theoretical capacity of this material is 286 mAh/g.

EXAMPLE 3

Orthorhombic LiMnO2 was prepared by reaction between 1.1 mole LiOH (26.4 g) and 0.5 mole Mn$_2$O$_3$ (79 g) under flowing N$_2$ in a stainless steel tube. The starting materials were ground and pressed into pellets. As a loss of Li$_2$O was observed during 14–17 h of synthesis at 760–800° C., an excess of LiOH was used. No intermediate grinding was used since LiOH melts at 450° C., penetrating the entire reaction batch homogeneously. The final powder was blackish brown with shiny particles and powder XRD confirmed that the compound was purely orthorhombic. Chemical analysis of the material also confirmed that the stoichiometry corresponded to a Li/Mn ratio of approximately 1 and an oxidation state of Mn in the range +3 to +3.1. The mean particle size of the material was 30$\mu$. Being prepared at high temperature, this material is referred to as high temperature orthorhombic LiMnO$_2$ (HT-o-LiMnO$_2$).

A similar orthorhombic material, although with broader XRD lines, is available from SEDEMA, Tertre, Belgium. As this material is prepared at a lower temperature than the above 760–800° C., it is referred to as low temperature orthorhombic LiMnO$_2$ (LT-o-LiMnO$_2$). From a structural point of view, the two compounds are nearly identical, having the same crystal structure and composition. The broader XRD lines, however, indicate loss of long range order. The mean particle size of the material was 10$\mu$. The colour of the LT-o-LiMnO$_2$ is dark brown as opposed to the blackish brown HT-O-LiMnO$_2$ powder. The theoretical capacity of both compounds is 286 mAh/g.

EXAMPLE 4

Hexagonal LiFeO$_2$ (h-LiFeO$_2$) was obtained from α-NaFeO$_2$ by ion exchange at 300° C. 3 g (0.0271 mole) of α-NaFeO$_2$ were refluxed in 20 g (0.290 mole) of LiNO$_3$ for 5.5 h. The final batch was washed in 250–300 ml methanol, and subsequently dried at 100° C. in air, and at 130° C. under vacuum. Powder XRD showed that the dark reddish powder with small shiny particles had the hexagonal phase. The only detectable impurity was the starting material α-NaFeO$_2$ (less than 5%). The diffraction pattern yields lattice parameters of a=2.959(2)Å and c=14.55(5)Å, and V=110.3 Å$^3$. The theoretical capacity is 283 mAh/g.

EXAMPLE 5

β-NaMnO$_2$ was synthesized from equimolar amounts (Na/Mn=1) of Na$_2$CO$_3$ and MnO$_2$ by a solid state reaction. The batch was treated twice for 17 h at 900° C. Between firings the batch was reground. In order to avoid oxidation, quenching from 750° C. was used. The final product was a brown powder of β-NaMnO$_2$ with a few % of a second phase ascribed to β-Na$_x$MnO$_2$, x<1. The chemical analysis of the product confirmed the overall stoichiometry to be close to Na/Mn=1. The theoretical capacity of β-NaMnO$_2$ is 244 mAh/g.

EXAMPLE 6

α-NaFeO$_2$, which is thermodynamically stable below 760° C., was prepared from NaOH in 25 mol % excess and α-Fe$_2$O$_3$. After firing at 650° C. for 16 h, the hygroscopic reddish orange powder was washed with ethanol to remove excess NaOH. The phase purity was confirmed by powder XRD and no impurities were detected. The theoretical capacity of α-NaFeO$_2$ is 242 mAh/g.

EXAMPLE 7

Synthesis of LiNa$_{0.6}$MnO$_{1.8}$(Li$_5$Na$_3$Mn$_5$O$_9$) has been reported by E. Seipp, and R. Hoppe in *Z. Anorg and Allg. Chem.*, 538 (1986) 123–130. This group obtained the compound by a solid state reaction between simple oxides (Li$_2$O, Na$_2$O, MnO) in a Ni bomb at 700° C. for 14 days, using a ratio of Li:Na:Mn=2:1:2.

In the present work Li$_2$O, Na$_2$O and MnO were used as well, however in a molar ratio of 1:0.6:1 for Li:Na:Mn. The procedure was slightly modified compared to that reported by Seipp and Hoppes and the batch of 0.3311g Li$_2$O, 0.4120 g Na$_2$O and 1.510 g MnO was mixed in a mortar and wrapped in Ni-foil. The synthesis was carried out in the steel tube under flowing nitrogen at 650° C. for 14 h followed by 2 h at 700° C. The final product was a brownish orange powder. X-ray diffraction of the powdered product showed LiNa$_{0.6}$MnO$_{1.8}$ to be the major constituent, an unknown compound and MnO being the major impurities. Upon full extraction of lithium and sodium, the theoretical capacity of LiNa$_{0.6}$MnO$_{1.8}$ is 411 mAh/g.

EXAMPLE 8

Electrodes containing 69–79% by weight of m-LiMnO$_2$ (made as described in example 2), 4.8–5.2% Teflon and 16–26% Shawinigan carbon black, were made by mixing the oxide and carbon in a mortar with acetone. After drying, Teflon powder was added followed by grinding for 5–10 minutes, during which a plastic material formed. Electrodes were made from this material by rolling until the thickness of the film reaches 70–100 μm.

10–17 mg pellets were punched from the film, and dried under vacuum at 120–130° C. for 14 h. Such electrodes were cycled in spring loaded lithium metal based test cells, separated from the counter lithium electrode sheet by a porous glass fiber sheet, or alternatively a porous Celgard separator where applicable, soaked in the electrolyte. Two electrolyte configurations were used, EC/PC (1:1 by volume) with 1M LIPF$_6$ and 1M LiBF$_4$, respectively.

Cells were tested under galvanostatic charge conditions to fixed voltage limits, optionally followed by a period of potentiostatic charging at the upper voltage in order to bring the electrode in a reproducible state before each discharge. The specific capacity was calculated numerically from the voltage/time relationship and the amount of oxide in the electrode. The voltage was measured with lithium as the reference. On the initial charge to 4.7 V the capacity was 260 mAh/g. Cycling between 3.5 and 4.3V provided 28% of the initial capacity, i. e. 72 mAh/g. No differences were observed for the two electrolyte configurations applied. FIG. 1 shows the voltage-capacity relation for a Li/m-LiMnO$_2$ couple.

EXAMPLE 9

Figure 2:
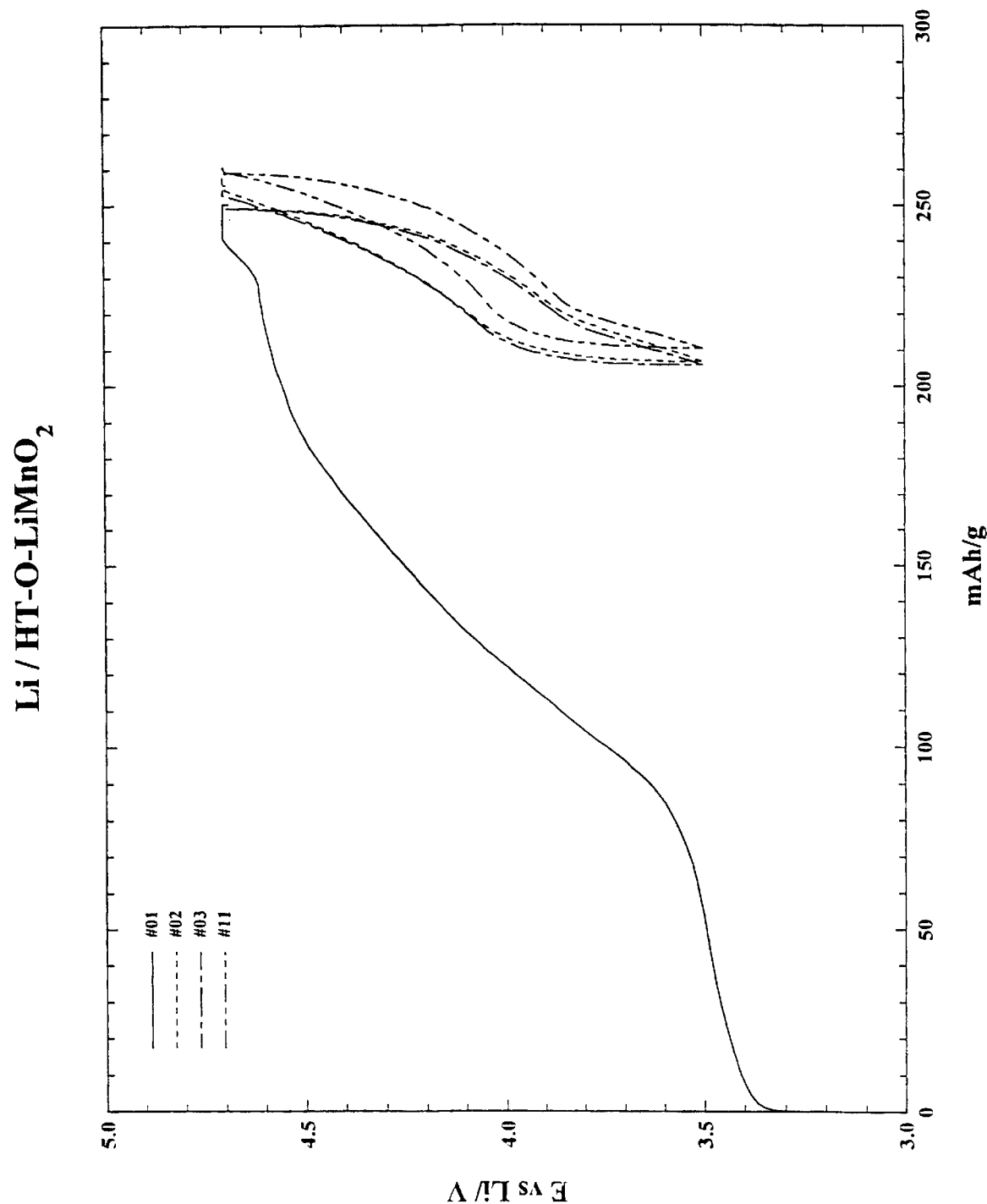
FIG. 2 shows the voltage-capacity relationship for a Li/HT-o-LiMnO$_2$ couple during first charge and subsequent discharge-charge cycling.

A cell was made as described in example 8, and using the HT-o-LiMnO$_2$ material made as described in example 3. The initial charge capacity is 248 mAh/g when charged to 4.7 V vs. Li/Li$^+$. cycling of HT-o-LiMnO$_2$ between 3.5 and 4.3V showed a stable capacity of 42 mAh/g. Identical results were obtained using any of the salt/solvent combinations of 1 M LiPF6 or 1 M LiBF4 in EC/PC (1:1 volume ratio) or EC/DEC (2:1 volume ratio). FIG. 2 shows the voltage-capacity relation for a Li/HT-o-LiMnO$_2$ couple.

EXAMPLE 10

Figure 3:
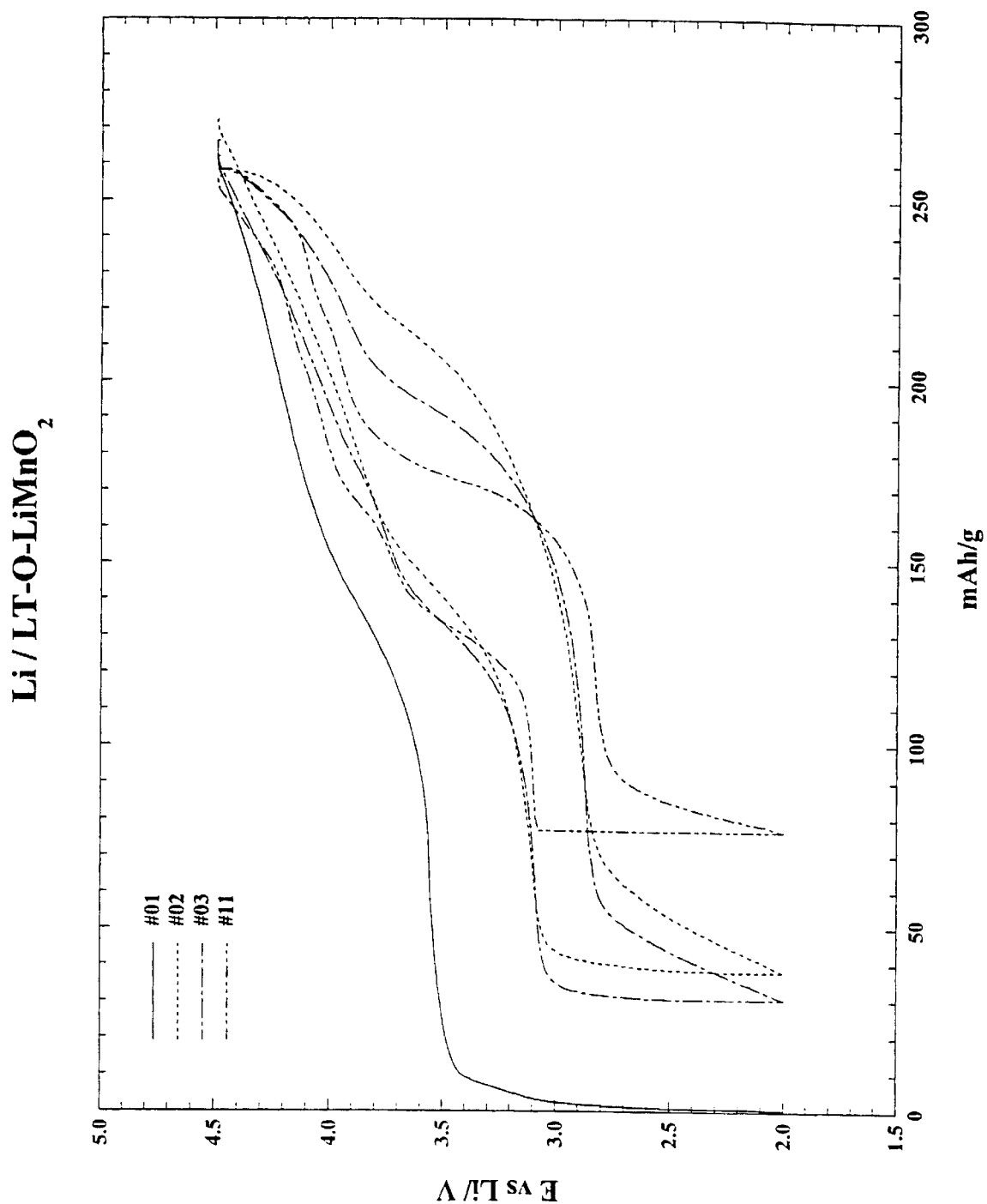
FIG. 3 is a graph which shows the voltage-capacity relationship for a Li/LT-o-LiMnO$_2$ couple during first charge and subsequent discharge-charge cycling.

A cell was made as described in example 8, substituting LT-o-LiMnO$_2$ of example 3 for m-LiMnO$_2$ The electrolyte configurations of example 9 were used. A capacity of 264 mAh/g was observed upon charging to 4.5V vs. Li/Li$^+$, higher than for the above HT-o-LiMnO$_2$. FIG. 3 is a graph which shows the voltage-capacity relation for a Li/LT-o-LiMnO$_2$ couple.

EXAMPLE 11

A cell was made as described in example 8, using the α-NaFeO$_2$ obtained as described in example 6, and using the same electrolyte configurations as described in example 9. The electrochemical behavior of α-NaFeO$_2$ shows that the material delivers a first charge capacity of about 219 mAh/g when charged at C/50-rate to 4.7 V vs. Li/Li$^+$.

EXAMPLE 12

Figure 4:
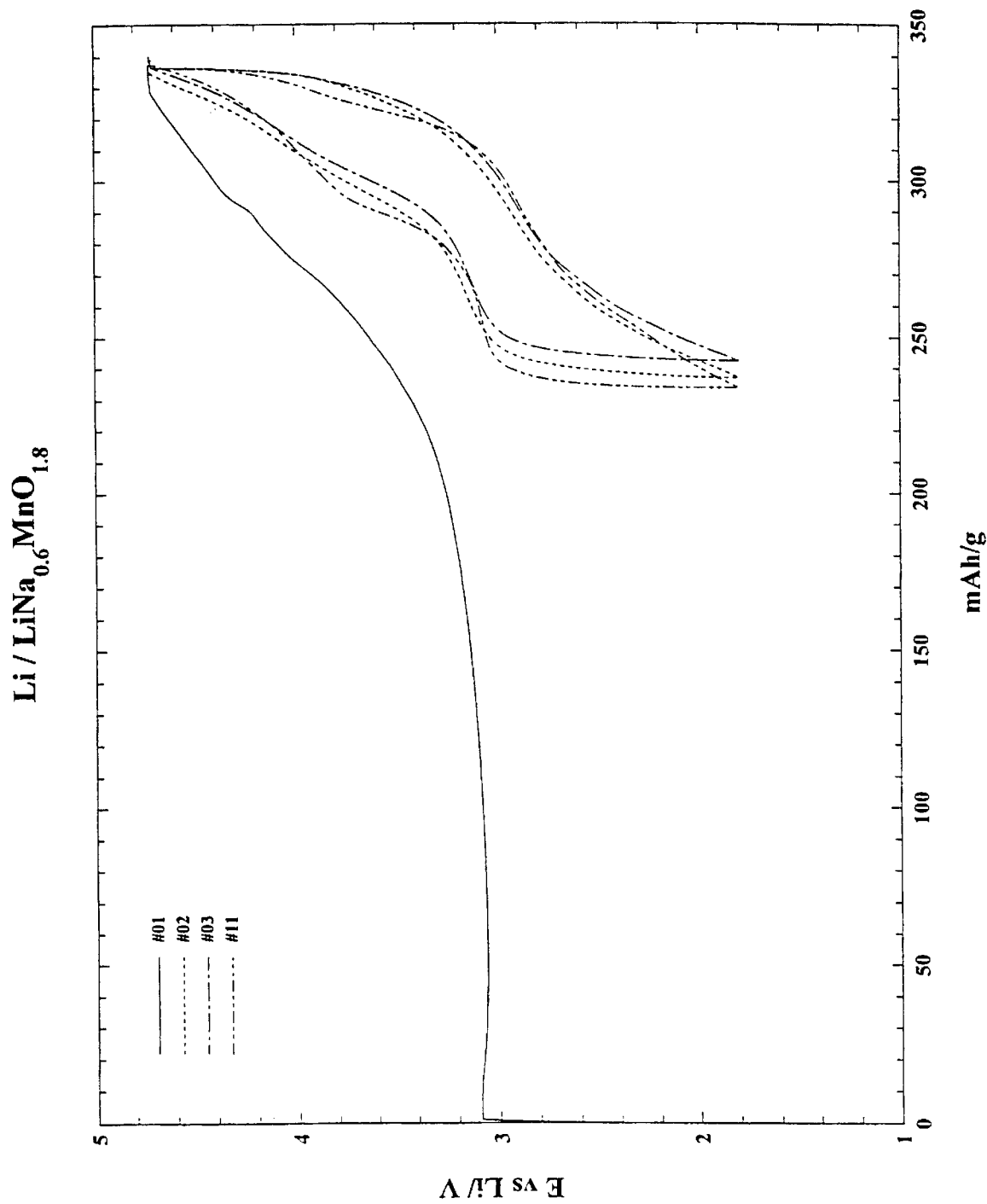
FIG. 4 shows the voltage-capacity relationship for a Li/LiNa$_{0.6}$MnO$_{1.8}$ couple during first charge and subsequent discharge-charge cycling.

A cell was made as described in example 8, using the LiNa$_{0.6}$MnO$_{1.8}$ as obtained in example 7, and the 1M LiPF$_6$ in EC/DMC (1:1 volume ratio) electrolyte configuration. On the initial charge to 4.7 V the capacity was 339 mAh/g. Cycling between 3.5 and 4.3V provided 4% of the initial capacity, i.e. 13 mAh/g. FIG. 4 shows the voltage-capacity relationship for a Li/LiNa$_{0.6}$MnO$_{1.8}$ couple.

EXAMPLE 13

Composite m-LiMnO$_2$/LiMn$_2$O$_4$-cathodes were made according to the ratio between the capacities, in such a way that the first charge capacities of the two materials were equal:

| Cathode Components | First charge capacity (mAh/g) | Relative content (%) |
| --- | --- | --- |
| m-LiMnO$_2$ | 260 | 31.9 |
| LiMn$_2$O$_4$ | 122 | 68.1 |

Figure 5:
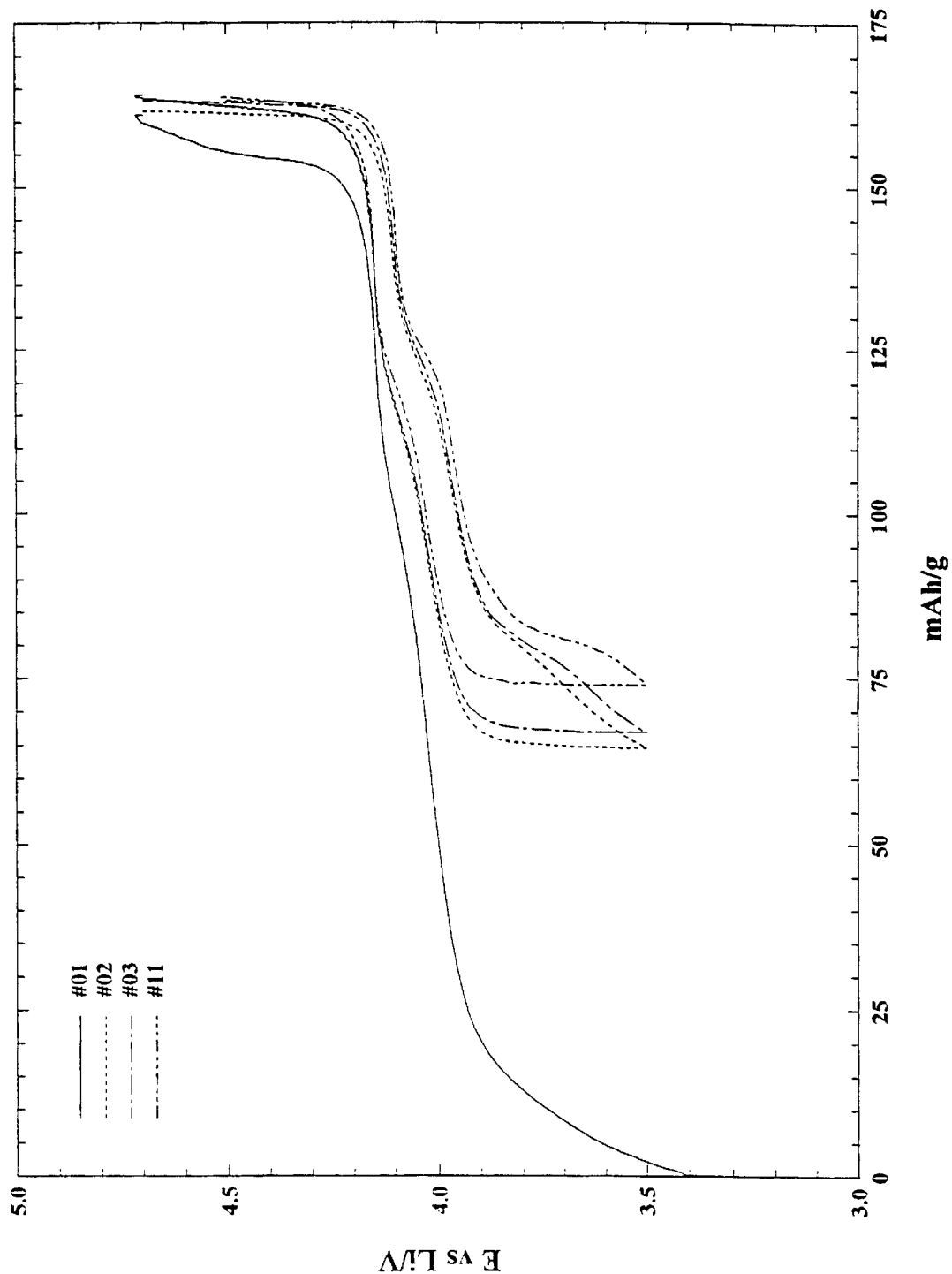
FIG. 5 is a graph which shows the voltage-capacity relationship for a Li/composite m-LiMnO$_2$+LiMn$_2$O$_4$ cell configuration during first charge and subsequent discharge-charge cycling.

Electrodes and cells were made as described in example 8, using the same electrolytes and lithium as the counter electrode. The m-LiMnO$_2$ compound is identical to the material described in example 2. The capacities obtained from the first charge (162 mAh/g) corresponded to the weighted first charge capacities of the two materials (166 mAh/g). In subsequent cycles, the capacity (98 mAh/g) was slightly higher than that of the pure LiMn$_2$O$_4$ content of the electrode (83 mAh/g). In fact, the reversible capacity of the composite was in accordance with the weighted reversible capacity of the components (106 mAh/g). FIG. 5 is a graph which shows the voltage-capacity relationship for a Li/composite m-LiMnO$_2$+LiMn$_2$O$_4$ cell configuration.

EXAMPLE 14

Composite α-NaFeO$_2$+LiMn$_2$O$_4$ cathodes were made according to the ratio between the capacities, in such a way that the first charge capacities of the two materials were equal:

| Cathode Components | First charge capacity (mAh/g) | Relative content (%) |
|---|---|---|
| α-NaFeO$_2$ | 219 | 35.8 |
| LiMn$_2$O$_4$ | 122 | 64.2 |

Figure 6:
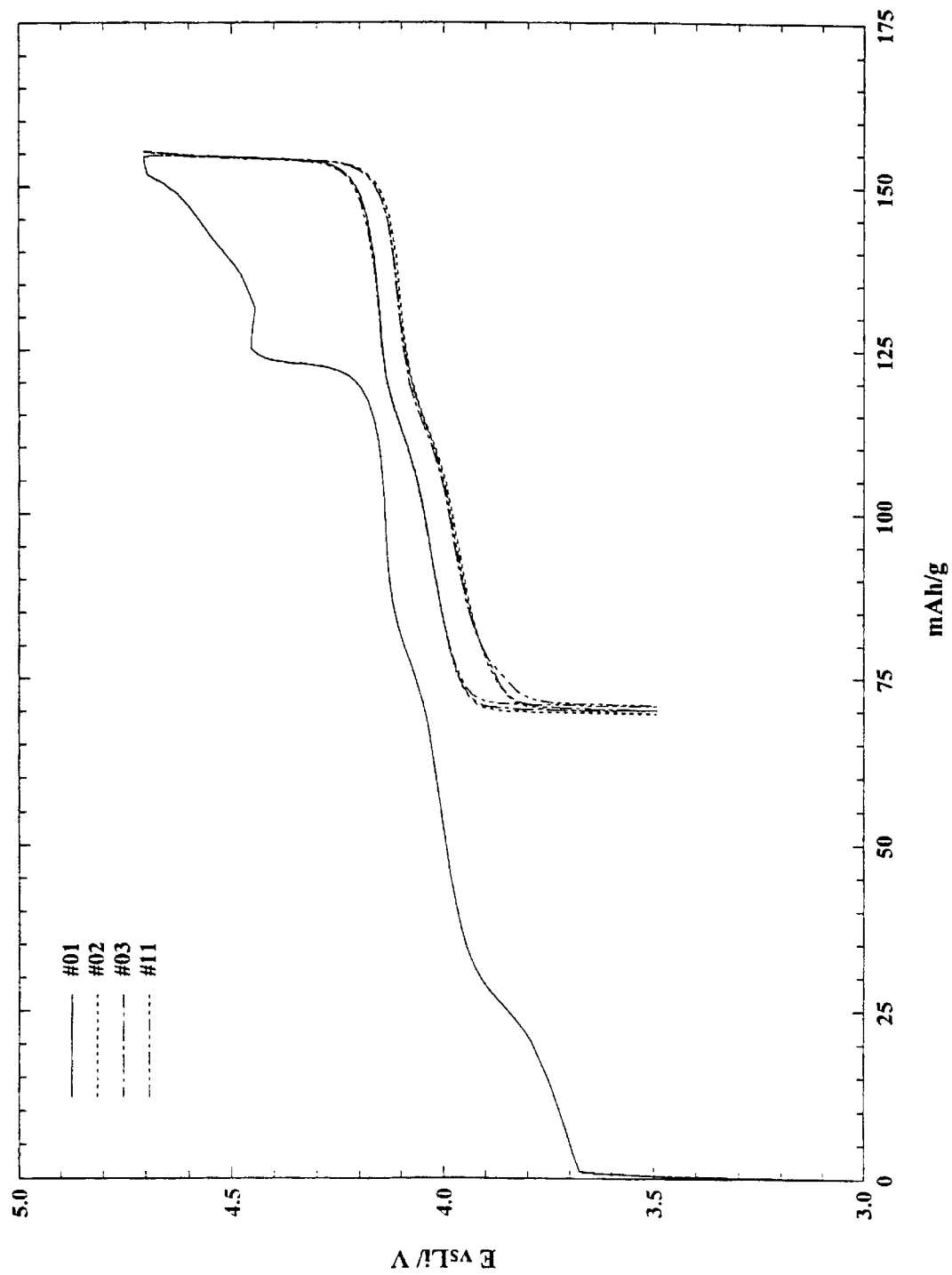
FIG. 6 is a graph which shows the voltage-capacity relationship for a Li/composite α-NaFeO$_2$+LiMn$_2$O$_4$ cell configuration during first charge and subsequent discharge-charge cycling.

Electrodes and cells were made as described in example 8, using the same electrolyte configurations and lithium as counter electrode. The α-NaFeO$_2$ compound is identical to the material described in examples 6 and 11. The initial capacity of the cell when charged to 4.7V vs. Li/Li$^+$ was 155 mAh/g, in accordance with the weighted capacity of 157 mAh/g. The capacity in subsequent cycles (86 mAh/g) was slightly higher than the weighted value of 79 mAh/g. FIG. 6 is a graph which shows the voltage-capacity relationship for the Li/composite α-NaFeO$_2$+LiMn$_2$O$_4$ cell configuration.

EXAMPLE 15

Composite LT-o-LiMnO$_2$/LiMn$_2$O$_4$ electrodes were made by mixing 85% by weight of mixed oxide (1:1 charge ratio), 10% by weight of Shawinigan Black and 5% by weight of polymer binder. The mixture was treated in a ball mill for 17 hours until a uniform ink was formed. Electrodes were made by screen printing onto aluminum current collectors. Subsequently, excess solvent was evaporated and the electrodes were dried at about 50° C. for 16 h.

A carbon anode was prepared in a similar manner by milling a mixture of 86% by weight of Conoco LSR as active carbon, 10% by weight of Shawinigan Black as conductive carbon diluent and 4% by weight of EPDM as binder. The anode ink was screen printed onto copper foil current collectors.

Cells were assembled as described in example 8 substituting the carbon anode foil for lithium foil. The same electrolyte configurations were employed.

The cell composition was based on the assumption that the anode irreversible loss is approx. 50%. The above cathode is composed accordingly, i.e. half of the cathode inital capacity originating from the "reversible" LiMn$_2$O$_4$ and half of the capacity originating from the "irreversible" LT-o-LiMnO$_2$. Further, the ratio between the anode and cathode capacities, reversible as well as irreversible, were adjusted in such a way that the anode capacity was approximately 10% higher than the cathode capacity. This construction was made to eliminate the risk of plating of metallic lithium on the carbon anode, and ensured that all LT-o-LiMnO$_2$ would be needed in order to compensate the capacity loss of the anode.

Figure 7:
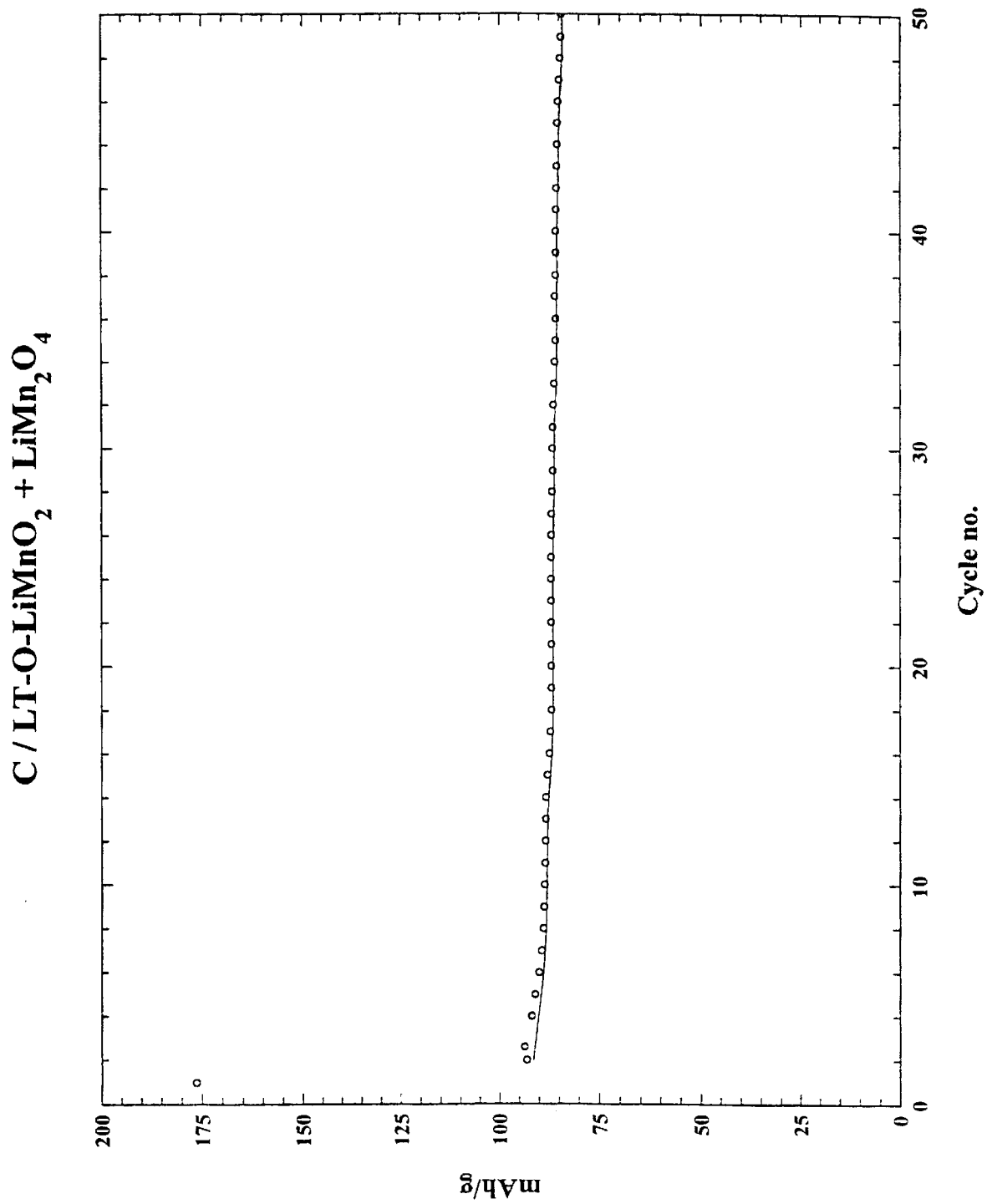
FIG. 7 shows capacity as a function of the number of charge/discharge cycles for a C/composite LT-o-LiMnO$_2$+LiMn$_2$O$_4$ cell configuration.

During the first high rate charge of the cell to 5V, a specific capacity of 175 mAh/g was extracted from the composite cathode, compared to 167 mAh/g for the individual components. During subsequent cycling, a constant capacity of approximately 85 mAh/g was retained, corresponding to the contribution from LiMn$_2$O$_4$ (83 mAh/g), i.e. in this case only rather little reversible capacity was observed from LT-o-LiMnO$_2$. FIG. 7 shows the capacity as function of the number of charge/discharge cycles for a C/composite LT-o-LiMnO$_2$+LiMn$_2$O$_4$ cell configuration.

EXAMPLE 16

Figure 8:
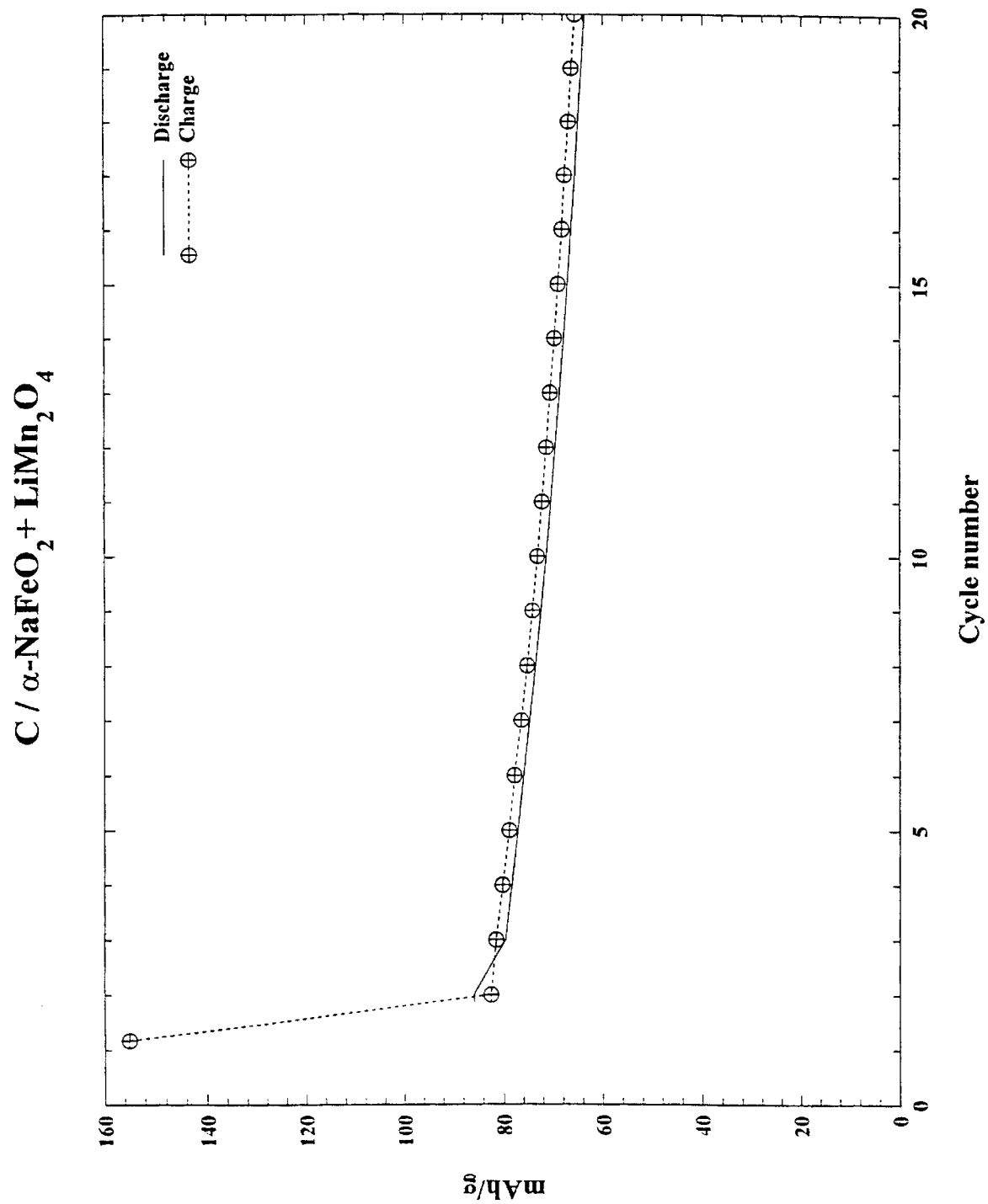
FIG. 8 is a graph showing capacity as a function of the number of charge/discharge cycles for a C/composite α-NaFeO$_2$+LiMn$_2$O$_4$ cell configuration.

Composite α-NaFeO$_2$/LiMn$_2$O$_4$ electrodes were made as described in example 14 using the same compounds and with a charge ratio of 1:1 between the two cathode active components. A carbon anode was made in the way described in example 15. Cells were assembled as described in example 8 by replacing the lithium foil with the carbon anode foil. A 1 M LiBF$_4$ in EC/PC (1:1 volume ratio) electrolyte was employed. The capacity extracted during the first charge at low rate to 4.7 V was 155 mAh/g, in accordance with the capacity obtained in lithium metal cells (example 14). In subsequent cycles a capacity corresponding to the rechargeable LiMn$_2$O$_4$ capacity was obtained (86 mAh/g). This result is in accordance with the result of example 14, displaying the low rechargeable capacity of α-NaFeO$_2$ FIG. 8 is a graph showing the capacity as function of the number of charge/discharge cycles for a C/composite α-NaFeO$_2$+LiMn$_2$O$_4$ cell configuration.

What is claimed is:

1. A rechargeable electrochemical cell comprising a negative electrode, an electrolyte and a positive electrode, said positive electrode having a structure which comprises:
    (a) one or more materials selected from the group consisting of LiMn$_2$O$_4$, LiCoO$_2$, LiNiO$_2$, LiNi$_x$Co$_{(1-x)}$O$_2$ where 0<x<1; and
    (b) one or more materials selected from the group consisting of orthorhombic LiMnO$_2$, monoclinic LiMnO$_2$ (m-LiMnO$_2$), α-NaMnO$_2$, β-NaMnO$_2$, α-NaFeO$_2$, and lithium/sodium compounds of the formula Li$_x$Na$_y$M(II)O$_{1-1/2(x+y)}$, where x≧0, y≧0 and x+y≦2, and where M(II) is a transition metal in oxidation state +2, selected from the group consisting of Mn, Co, Ni and Fe;
    the materials of (a) being present in the electrode structure in a total amount corresponding to 20–98% by weight of the complete electrode structure; and
    the materials of (b) being present in the electrode structure in a total amount corresponding to 1–79% by weight of complete electrode structure, with the proviso that in the case of the materials of (b) including any of α-NaMnO$_2$, β-NaMnO$_2$, α-NaFeO$_2$ and Li$_x$Na$_y$M(II)O$_{1+1/2(x+y)}$, the amount of active sodium originally present in the positive electrode is lower than the amount of lithium originally present in the electrolyte phase, and with the further proviso, that any material of (b) in the positive electrode structure has a higher first charge specific capacity than any material of (a) in the positive electrode structure.

2. A rechargeable electrochemical cell comprising a negative electrode, an electrolyte and a positive electrode, the positive electrode structure comprising:
    (a) one or more materials selected from the group consisting of LiMn$_2$O$_4$, LiCoO$_2$, LINiO$_2$, LiNi$_x$Co$_{1-x}$O$_2$ where 0<x<1; and
    (b) monoclinic LiMnO$_2$;
    the materials of (a) being present in the electrode structure in a total amount corresponding to 20–98% by weight of complete electrode structure; and
    the monoclinic LiMnO$_2$ of(b) being present in the electrode structure in an amount corresponding to 1–79% by weight of the complete electrode structure, with the proviso that the monoclinic LiMnO$_2$ in the positive electrode structure has a higher first charge specific capacity than any material of (a) in the positive electrode structure.

3. A rechargeable electrochemical cell comprising a negative electrode, an electrolyte and a positive electrode, the positive electrode structure comprising:
    (a) one or more materials selected from the group consisting of LiMn$_2$O$_4$, LiCoO$_2$, LiNiO$_2$, LiNi$_x$Co$_{1-x}$O$_2$ where 0<x<1; and (b) orthorhombic $LiMnO_2$;

the materials of (a) being present in the electrode structure in a total amount corresponding to 20–98% by weight of the complete electrode structure; and the orthorhombic $LiMnO_2$ of (b) being present in the electrode structure in an amount corresponding to 1–79% by weight of the complete electrode structure, with the proviso that the orthorhombic $LiMnO_2$ in the positive electrode structure has a higher first charge specific capacity than any material of (a) in the positive electrode structure.

4. A rechargeable electrochemical cell according to claim 3, wherein the orthorhombic $LiMnO_2$ is characterised by peaks of full width at half maximum of less than 0.2° at 2θ-values of 25.0°, 39.4° and 45.2° upon XRD analysis using CuKα.

5. A rechargeable electrochemical cell according to claim 3, wherein the orthorhombic $LiMnO_2$ is prepared at a temperature above 600° C.

6. A rechargeable electrochemical cell according to claim 3, wherein the orthorhombic $LiMnO_2$ has a mean particle size in the range 20–40μ.

7. A rechargeable electrochemical cell according to claim 3, wherein the orthorhombic $LiMnO_2$ is characterised by peaks of full width at half maximum of at least 0.25° at 2θ-values of 25.0°, 39.4° and 45.2° upon XRD analysis using CuKα.

8. A rechargeable electrochemical cell according to claim 3, wherein the orthorhombic $LiMnO_2$ is prepared at a temperature up to 600° C.

9. A rechargeable electrochemical cell according to claim 3, wherein the orthorhombic $LiMnO_2$ has a mean particle size in the range 5–15μ.

10. A rechargeable electrochemical cell comprising a negative electrode, an electrolyte and a positive electrode, the positive electrode structure comprising:

(a) one or more materials selected from the group consisting of $LiMn_2O_4$, $LiCoO_2$, $LiNiO_2$, $LiNi_xCo_{1-x}O_2$ where 0<x<1; and (b) α-$NaFeO_2$;

the materials of (a) being present in the electrode structure in a total amount corresponding to 20–98% by weight of the complete electrode structure; and the α-$NaFeO_2$ of (b) being present in the electrode structure in an amount corresponding to 1–79% by weight of the complete electrode structure, with the proviso that the amount of active sodium originally present in the positive electrode is lower than the amount of lithium originally present in the electrolyte phase, and with the further proviso that the α-$NaFeO_2$ has a higher first charge specific capacity than any material of (a) in the positive electrode structure.

11. A rechargeable electrochemical cell comprising a negative electrode, an electrolyte and a positive electrode, the positive electrode structure comprising:

(a) one or more materials selected from the group consisting of $LiMn_2O_4$, $LiCoO_2$, $LiNiO_2$, $LiNi_xCo_{1-x}O_2$ where 0<x<1; and (b) one or more materials selected from the group consisting of lithium/sodium compounds of the formula $Li_xNa_yM(II)O_{1-1/2(x+y)}$, where $x \geq 0$, $y \geq 0$ and $x+y \leq 2$, and where M(II) is a transition metal in oxidation state +2, selected from the group consisting of Mn, Co, Ni and Fe;

the materials of (a) being present in the electrode structure in a total amount corresponding to 20–98% by weight of the complete electrode structure; and the lithium/sodium compounds of the formula $Li_xNa_yM(II)O_{1+1/2(x+y)}$, where $x \geq 0$, $y \geq 0$ and $x+y \leq 2$, and where M(II) is a transition metal in oxidation state +2, selected from the group consisting of Mn, Co, Ni and Fe of (b) being present in the electrode structure in a total amount corresponding to 1–79% by weight of the complete electrode structure, with the proviso that the amount of active sodium originally present in the positive electrode is lower than the amount of lithium originally present in the electrolyte phase and with the further proviso that any material of (b) in the positive electrode structure has a higher first charge specific capacity than any material of (a) in the positive electrode structure.

12. An electrochemical cell according to claim 1, in which the negative electrode comprises a metal capable of alloying with lithium, or a metal oxide which can react with lithium to form the corresponding metal capable of alloying with lithium, or a carbon structure capable of intercalating lithium.

13. An electrochemical cell according to claim 12, in which the negative electrode consists of a coke or a carbon black.

14. An electrochemical cell according to claim 13, in which the materials selected from (a) and the materials selected from (b) are present in the electrode structure in a total amount corresponding to 50–98% and 1–49% by weight of the complete electrode structure, respectively, with the proviso that in the case of the materials of (b) including any of α-$NaMnO_2$, β-$NaMnO2$, α-$NaFeO_2$ and $Li_xNa_yM(II)O_{1+1/2(x+y)}$, the amount of active sodium originally present in the positive electrode is lower than the amount of lithium originally present in the electrolyte phase.

15. An electrochemical cell according to claim 12, in which the negative electrode consists of a graphite.

16. An electrochemical cell according to claim 15, in which the materials selected from (a) and the materials selected from (b) are present in the electrode structure in a total amount corresponding to 50–98% and 1–49% by weight of the complete electrode structure, respectively, with the proviso that in the case of the materials of (b) including any of α-$NaMnO_2$, β-$NaMnO_2$, α-$NaFeO_2$ and $Li_xNa_yM(II)O_{1+1/2(x+y)}$, the amount of active sodium originally present in the positive electrode is lower than the amount of lithium originally present in the electrolyte phase.

17. An electrochemical cell according to claim 1, in which the electrolyte comprises one or more non-aqueous solvent selected from the group consisting of ethylene carbonate, propylene carbonate, dimethyl carbonate, diethyl carbonate, γ-valerolactone, γ-butyrolactone and one or more salts selected from the group consisting of $LiCF_3SO_3$, $LiAsF_6$, $LiBF_4$, $LiPF_6$ and $LiClO_4$.

* * * * *